3,484,234
FLUORIDE-CONTAINING AGGLOMERATION PRODUCT

Christo Nikolov Guenev, Via Roma 231, Cagliari, Italy
No Drawing. Filed July 14, 1966, Ser. No. 565,064
Claims priority, application Switzerland, July 14, 1965, 9,880/65
Int. Cl. C21b *1/26;* C09k *3/00*
U.S. Cl. 75—94      2 Claims

ABSTRACT OF THE DISCLOSURE

A fluoride-containing agglomeration product such as fluorspar containing casein or casein glue as a binder. The fluoride-containing agglomeration product may also contain a protective coating of waterglass and/or barium sulphate on the surface thereof to prevent the lumps of the fluoride material from dusting.

---

To meet the pressing requirements of the steel industry for lumpy fluorspar isolated direct from fluorspar ores, attempts have recently been made to an increasing extent to replace this by agglomeration products prepared from calcium fluoride concentrates (filter cakes) by means of a binder.

Binders hitherto used for this purpose, such as cement, waterglass, starch, lignin sulphonate, organic compounds, such as occur in the petroleum industry, and other substances, have the disadvantage that in order to develop their full effect they have to be added in large amounts, or that they introduce into the agglomerate considerable amounts of undesirable constituents, such as sulphur and silicic acid, or that high temperatures are needed for the preparation of such agglomerates. Lumps of fluorspar prepared in this way also do not have adequate strength, easily break up and readily disintegrate upon contact with water.

The present invention therefore relates to fluoride agglomeration products which are not attended by the said disadvantages.

The fluoride-containing agglomeration product in accordance with this invention comprises calcium fluoride, casein or casein glue and/or a protective layer of a mixture of waterglass and barium sulphate.

Fluoride-containing agglomeration products in accordance with the invention may be obtained by mixing the calcium fluoride concentrate obtained as a filter cake with casein or casein glue. If it is desired to apply the said protective layer to the lumps of fluorspar, this may be carried out by treating the lumps of fluorspar in a bath containing a waterglass solution and barium sulphate. It has been found that in general it is sufficient to add 1% or even less of binder. It is possible in this way to prepare from moist filter cakes, lumps of fluorspar which when sufficiently pure fluoride concentrate has been used may have a content of even more than 98% of $CaF_2$, are sufficiently hard for practical purposes and do not disintegrate in contact with water.

The preparation may be carried out in a very simple way. Thus casein glue, which has previously been dissolved in water, may be introduced into a mixing or kneading appliance and mixed with a small amount of filter cake, the remainder of the filter cake then being added. The thick pasty composition obtained in this way is initimately mixed and finally shaped into pieces in a suitable shaping appliance. The shaped articles obtained harden within a few days at room temperature and are then ready for use. The hardening process may be shortened by the use of heat. Casein may be used instead of casein glue. In this case addition of some lime to the pasty composition is advisable to obtain water-resistant lumps of fluorspar.

If lumps of fluorspar in accordance with this invention are provided with a protective layer, they acquire improved properties so that the possibility of dust forming by rubbing the fluorspar lumps is entirely excluded. For this purpose the fluorspar lumps may be treated in a bath consisting of a mixture of waterglass solution and barium sulphate so that the individual lumps are coated with a layer of the said mixture which remains as a crust as hard as stone on the individual lumps.

The following examples are illustrative but not limitative of the present invention:

EXAMPLE 1

10 parts by weight of casein glue is dissolved in sufficient water to effect the desired dissolution. The obtained solution is then intimately admixed with 1000 parts by weight of calcium fluoride concentrate (filter cake obtained in per se conventional manner from fluorspar ore).

The so-obtained agglomerated mass is shaped into lumps of any desired size, e.g. that suitable for use in the steel industry, and these lumps are allowed to dry and harden in the ambient atmosphere. If desired, drying and hardening can be accelerated by the application of moderate heat.

The resultant dried and hardened lumps are then ready for use.

EXAMPLE 2

The procedure according to Example 1 is repeated, except that the casein glue is replaced by a corresponding quantity of casein. In this case, a sufficient amount of lime is incorporated into the mix to assure water-resistance of the obtained lumps.

EXAMPLE 3

In order to eliminate dusting of the lumps obtained according to Example 1 or 2, the said lumps are immersed in an aqueous solution of waterglass, whereby an antidusting coating is provided thereon waterglass whereby, on removal of the lumps from the bath, they have an antidusting coating therearound, so that the possibility of dusting, due e.g., to rubbing together of the lumps, is excluded.

EXAMPLE 4

The procedure according to Example 3 is repeated, except that the treating bath also contains a sufficient amount of barium sulfate to impart a stone hard crust around the several treated lumps.

What is claimed is:

1. A fluoride-containing agglomeration product which comprises calcium fluoride and a protective coating of a mixture of waterglass and barium sulphate.
2. A fluoride-containing agglomeration product which consists essentially of calcium fluoride and casein or casein glue as a binder and a protective coating of a mixture of waterglass and barium sulphate on the surface thereof.

(References on following page)

References Cited

UNITED STATES PATENTS

| | | | |
|---|---|---|---|
| 2,220,383 | 11/1940 | Abbott et al. | 75—93 |
| 266,143 | 10/1882 | Henderson | 106—148 X |
| 848,746 | 4/1907 | Isaacs | 106—148 X |
| 1,848,323 | 3/1932 | Davies | 75—936 |
| 2,303,746 | 12/1942 | Kihlgren et al. | |
| 2,518,366 | 8/1950 | Pease | 148—23 |
| 2,921,863 | 1/1960 | Selby et al. | 117—54X |
| 3,033,713 | 5/1962 | Bielenberg et al. | 148—23 |

L. DEWAYNE RUTLEDGE, Primary Examiner

G. K. WHITE, Assistant Examiner

U.S. Cl. X.R.

106—148; 75—44